United States Patent [19]

Nicholson

[11] Patent Number: 5,056,956
[45] Date of Patent: Oct. 15, 1991

[54] BEACH PROTECTION APPARATUS

[76] Inventor: Hubert H. Nicholson, 4710 Tammy Dr. NE., Dalton, Ga. 30721

[21] Appl. No.: 675,857

[22] Filed: Mar. 27, 1991

[51] Int. Cl.$^5$ .............................................. E02B 3/12
[52] U.S. Cl. ...................................... 405/17; 405/16; 405/60
[58] Field of Search ................ 405/16, 17, 18, 19, 405/20, 15, 60; 210/242.4

[56] References Cited

U.S. PATENT DOCUMENTS

| | | | |
|---|---|---|---|
| 1,900,341 | 3/1933 | Henry | 405/16 |
| 1,990,855 | 2/1935 | Capps | 405/16 |
| 3,770,626 | 11/1973 | Ayers | 210/242.4 X |
| 4,172,680 | 10/1979 | Brown | 405/16 |
| 4,642,185 | 2/1987 | Turner | 210/242.3 |
| 4,681,680 | 7/1987 | Delons | 210/242.4 X |
| 4,692,059 | 9/1987 | Juutilainen | 405/63 |

Primary Examiner—Dennis L. Taylor
Assistant Examiner—J. Russell McBee
Attorney, Agent, or Firm—Leon Gilden

[57] ABSTRACT

An organization including angular chutes to accommodate waves directed thereon, wherein the chutes direct the water from the waves into a rearwardly directed trough longitudinally oriented and generally parallel relative to a shoreline. The water is directed through oil absorbent material mounted within an elongate trough. The trough includes an apertured floor and forward wall to permit drainage of water from the trough into a housing defined by the organization and drained forwardly thereof through forward slots arranged generally orthogonally relative to a forward edge of the bottom wall of the apparatus.

5 Claims, 5 Drawing Sheets

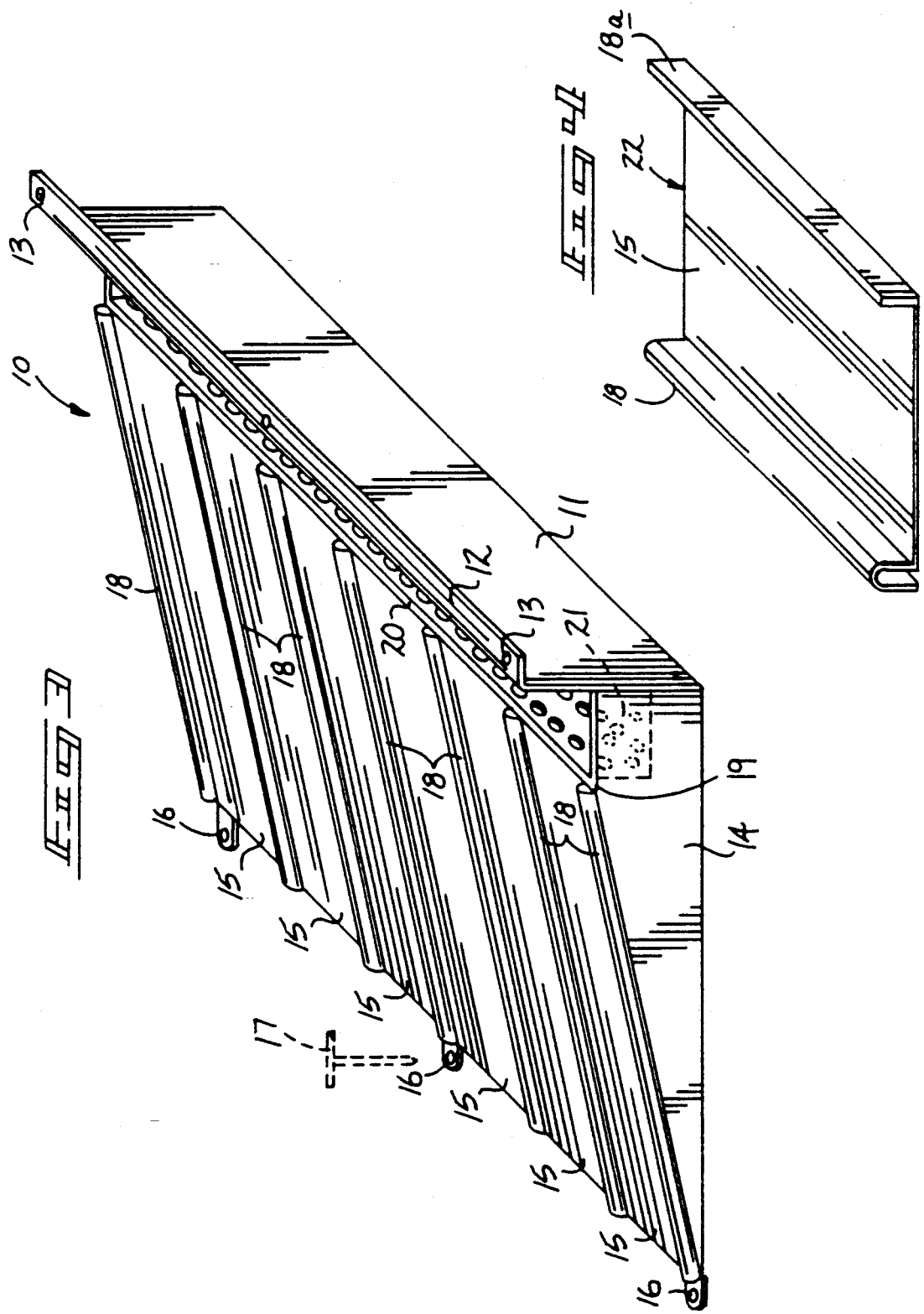

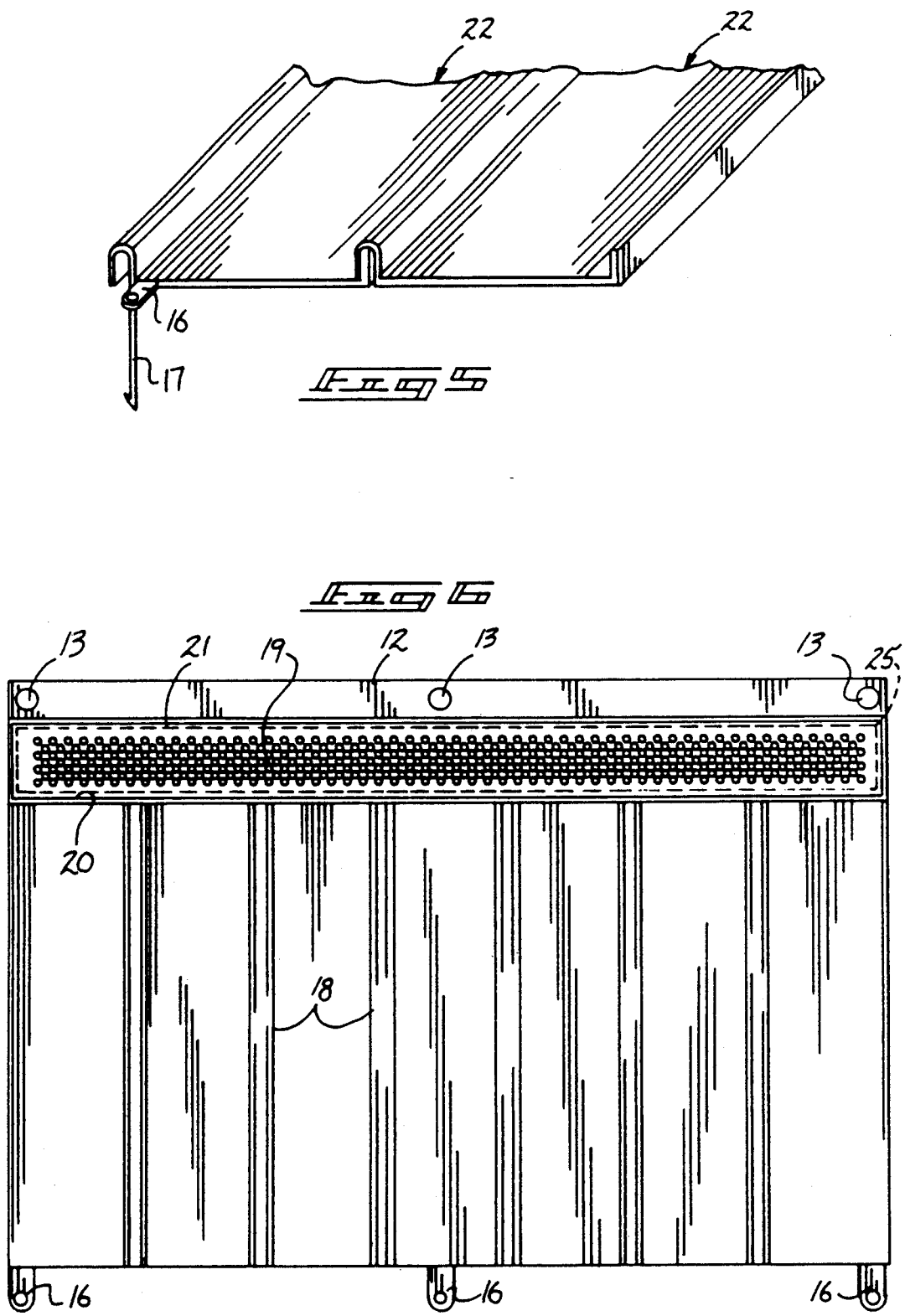

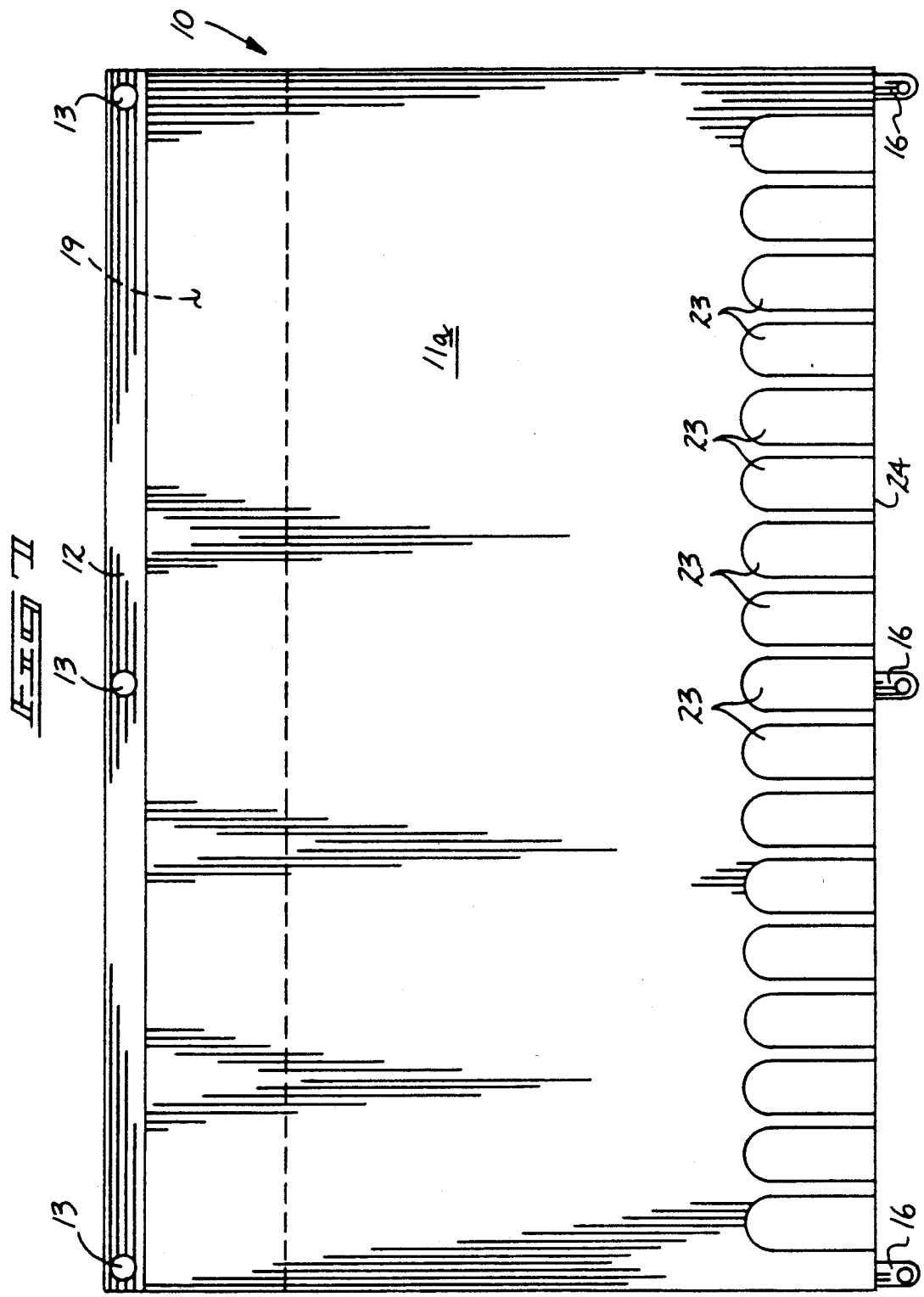

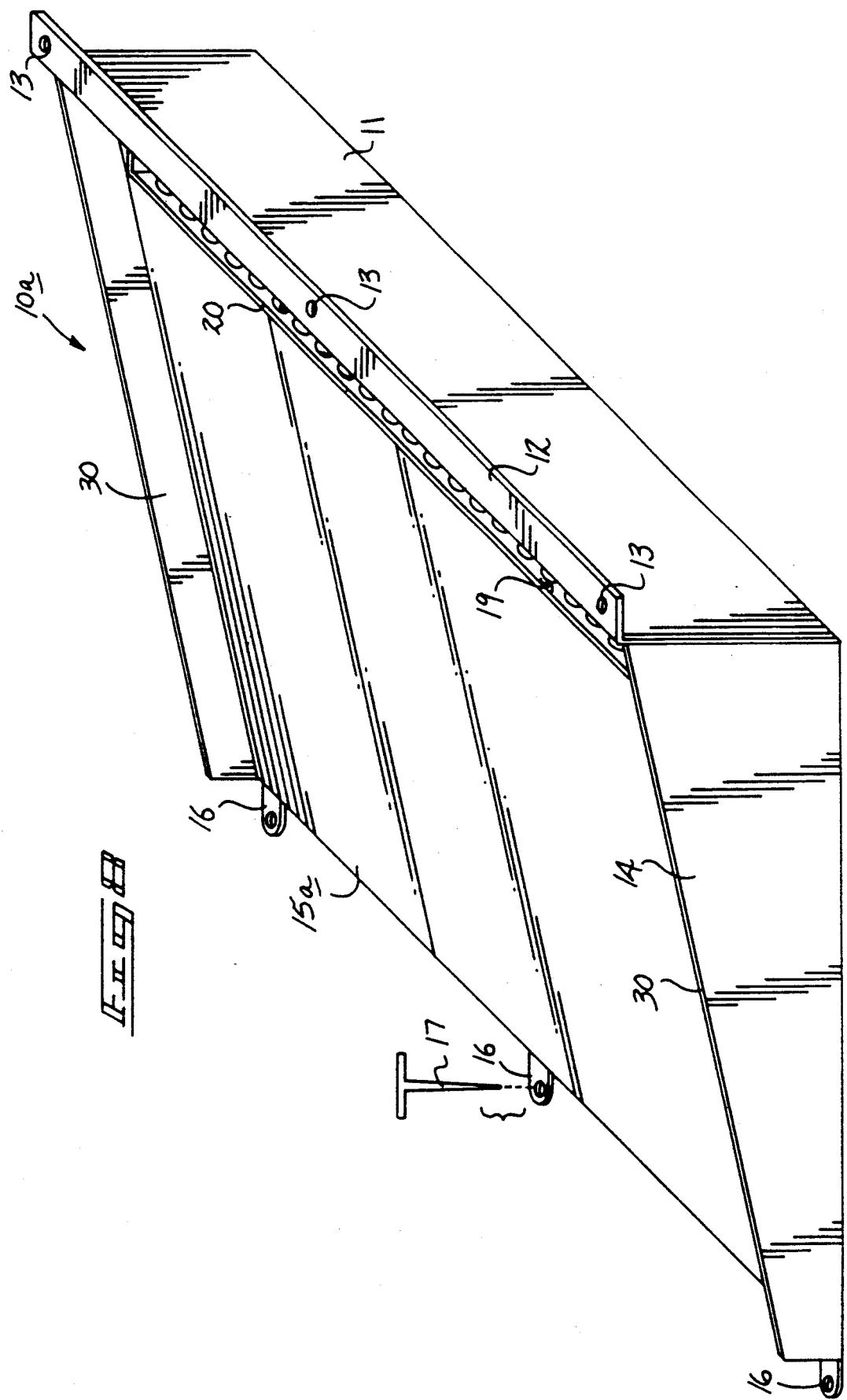

BEACH PROTECTION APPARATUS

BACKGROUND OF THE INVENTION

1. Field of the Invention

The field of invention relates to oil absorbing devices, and more particularly pertains to a new and improved beach protection apparatus wherein the same provides an organization to remove oil from contaminated waves and permit drainage of the water from the waves back to the beach shoreline.

2. Description of the Prior Art

Various beach protection apparatus has been provided in the prior art. Heretofore, however, such organizations have not availed themselves to remove oil contamination and the like from wave water directed onto the beach in a convenient and expedient manner as set forth by the instant invention. Examples of prior art include U.S. Pat. No. 4,692,059 to Juutilainen wherein an elongate web-like textile is directed into and along a beach front, wherein oil drawn from the shoreline is arranged to adhere to the textile fabric.

U.S. Pat. No. 3,770,626 to Ayers sets forth an absorbent body directed to orient water therethrough and cause pollutants to float into the free-flow passage to increase contact with absorbent body moving a polluting liquid from a water surface.

U.S. Pat. No. 4,642,185 to Turner, et al. sets forth a device for recovering oil floating on water in a plurality of disks rotatably mounted wherein disks immersed in water are associated with a scraper to remove oil from the rotary disks.

U.S. Pat. No. 4,681,680 to Delons provides recovery of hydrocarbons in the form of a sheet or nap at a surface of an aqueous medium to effect removal of the polluting hydrocarbons from the water medium.

As such, it may be appreciated that there continues to be a need for a new and improved beach protection apparatus as set forth by the instant invention which addresses both the problems of ease of use as well as effectiveness construction and in this respect, the present invention substantially fulfills this need.

SUMMARY OF THE INVENTION

In view of the foregoing disadvantages inherent in the known types of beach protection apparatus now present in the prior art, the present invention provides a beach protection apparatus wherein the same sets forth a reusable organization for removal of hydrocarbons such as oil from water directed at a beach permitting free-flow and egress of wave water back into the ocean body. As such, the general purpose of the present invention, which will be described subsequently in greater detail, is to provide a new and improved beach protection apparatus which has all the advantages of the prior art beach protection apparatus and none of the disadvantages.

To attain this, the present invention provides an organization including angular chutes to accommodate waves directed thereon, wherein the chutes direct the water from the waves into a rearwardly directed trough longitudinally oriented and generally parallel relative to a shoreline. The water is directed through oil absorbent material mounted within an elongate trough. The trough includes an apertured floor and forward wall to permit drainage of water from the trough into a housing defined by the organization and drained forwardly thereof through forward slots arranged generally orthogonally relative to a forward edge of the bottom wall of the apparatus.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved beach protection apparatus which has all the advantages of the prior art beach protection apparatus and none of the disadvantages.

It is another object of the present invention to provide a new and improved beach protection apparatus which may be easily and efficiently manufactured and marketed.

It is a further object of the present invention to provide a new and improved beach protection apparatus which is of a durable and reliable construction.

An even further object of the present invention is to provide a new and improved beach protection apparatus which is susceptible of a low cost of manufacture with regard to both materials and labor, and which accordingly is then susceptible of low prices of sale to the consuming public, thereby making such beach protection apparatus economically available to the buying public.

Still yet another object of the present invention is to provide a new and improved beach protection apparatus which provides in the apparatuses and methods of the prior art some of the advantages thereof, while simultaneously overcoming some of the disadvantages normally associated therewith.

Still another object of the present invention is to provide a new and improved beach protection apparatus wherein the same is arranged for reuse, as well as providing an oil-absorbing trough arranged generally parallel to a beach front and orthogonally to a wave directed at the apparatus.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an isometric illustration of a section of guide sheet utilized by the instant invention.

FIG. 5 is an isometric illustration of a plurality of guide sheets assembled together.

FIG. 6 is a top orthographic view of the instant invention.

FIG. 7 is a bottom orthographic view of the instant invention.

FIG. 8 is an isometric illustration of a further aspect of the instant invention.

DESCRIPTION OF THE PREFERRED EMBODIMENT

Figure 1:
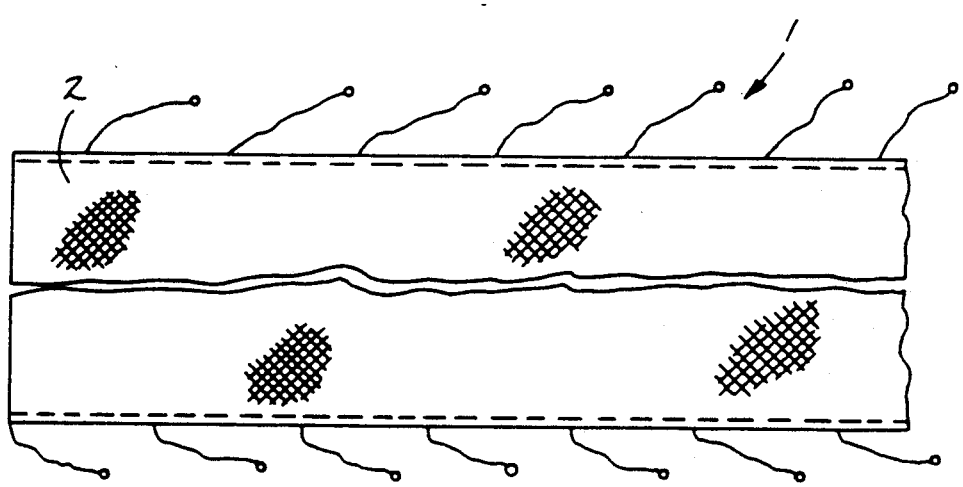
FIG. 1 is an orthographic frontal view, taken in elevation, of a prior art beach protection apparatus.

With reference now to the drawings, and in particular to FIGS. 1 to 8 thereof, a new and improved beach protection apparatus embodying the principles and concepts of the present invention and generally designated by the reference numeral 10 will be described.

Figure 2:
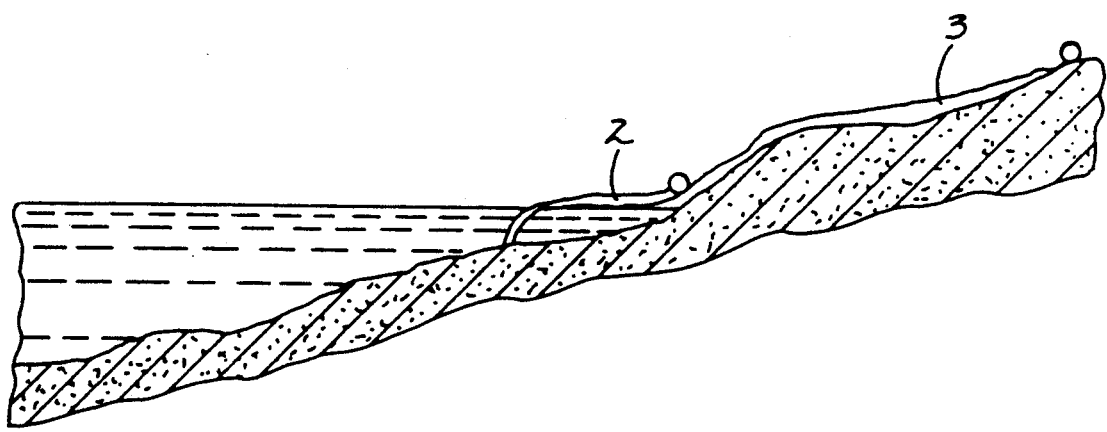
FIG. 2 is an orthographic side view, taken in elevation, of a beach protection apparatus set forth in FIG. 1.

FIGS. 1 and 2 illustrates a prior art beach protection apparatus 1, wherein a flexible web 2 is arranged parallel to a beach frontage utilizing cords and the like to mount the web to the beach, wherein the web is arranged to absorb oil directed thereto from wave fronts directed at the beach permitting protection of the beach, in a manner as set forth in U.S. Pat. No. 4,692,059.

More specifically, the beach protection apparatus 10 of the instant invention essentially comprises a housing defined by a rear wall 11 fixedly mounted to a bottom wall 11a, with side walls 14 orthogonally mounted to the bottom wall at opposed sides of the bottom wall and the rear wall 11. A top flange 12 is orthogonally mounted to a top longitudinal edge of the rear wall 11 and includes a plurality of top flange openings 13 to receive an anchor pin 17 therethrough, such as illustrated in FIG. 3. A plurality of guide chutes 15 extend parallel relative to one another between the side walls 14 and extend from a forward edge 24 of the bottom wall 11a (see FIG. 7 for a view of the bottom wall) rearwardly thereof terminating before the rear wall 11 defining a gap therebetween. An acute included angle is defined between the chutes 15 and the bottom wall 11a. The guide chutes 15 are defined as removable top sections 22, including a plurality of "U" shaped directing ribs 18 (see FIG. 4), and mounting ribs 18a arranged parallel relative to one another on opposed longitudinal sides of the central planar web defining each chute 15. Each mounting rib 18a receives an adjacent "U" shaped directing rib 18 thereon to inter-engage the removable top sections 22 together. Forward anchor tabs 16 are mounted to a plurality of the chutes 15 at forward edges thereof adjacent the bottom wall forward edge 24, with each forward anchor tab 16 formed with a respective opening to receive an associated anchor pin 17 therethrough. The anchor pin is directed through the forward anchor tab 16 and the top flange openings 13 securing the container relative to a shoreline, such as typified in FIG. 2 of the prior art, where it is desired in use that a bottom wall forward edge 24 be positioned in contiguous communication with the shoreline to receive various waves thereon. The waves are directed along the chutes 15 and are received within an elongate accumulating trough 19 that is coextensive with the rear wall 11 extending between the side walls 14 and positioned below the rear edges of each of the chutes 15. The trough 19 is defined by an apertured trough frontal wall 20 and an apertured trough bottom wall 21. Contained within the trough 19 is an oil absorbent insert 25 (see FIG. 6) of a conventional oil absorbent material suitable for the absorbency of hydrocarbons. Accordingly, water directed through the trough 19 is directed through the container underlying the removable sections 22 and is returned to a position forwardly of the container through water exit slots 23 formed orthogonally to and coextensive with the bottom wall forward edge 24 to permit drainage of water from the container subsequent to the filtration of water through the trough 19.

FIG. 8 sets forth a modification of the invention depicted as construction 10a, wherein a chute structure is defined as a modified chute organization 15a formed of a unitary integral construction, with wall members or flanges 30 mounted upwardly of the modified chute 15a to define a channel to direct the incoming tide fluid into the accumulating trough 19. The unitary construction sets forth an organization of enhanced rigidity and ease of construction for use in a beach protection organization. Typically, the top surface is eight feet to twenty feet in length, if required, stiffening ribs may be formed of a diminished height to effect a rigidity to the planar construction 15a. In this manner, lap joints are only formulated at each end of the unit adjacent the side walls. Accordingly, additional units may be positioned adjacent one another utilizing lap joints to secure such units together and direct incoming tidal flow into the trough structure as noted.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A beach protection apparatus comprising,
a container including an elongate rear wall mounted to a bottom wall at a rear terminal edge of the bottom wall, and
side walls orthogonally mounted to each side of the bottom wall, wherein the rear wall includes a top flange, the top flange including a plurality of openings directed therethrough, and
an anchor pin directed through each of the top flange openings to secure the rear wall to an underlying surface, and
a bottom wall forward edge, including a plurality of guide chutes extending coextensively between the side walls, wherein each of the guide chutes includes spaced parallel ribs, and wherein each of the guide chutes extends rearwardly of the bottom wall forward edge defining an acute included angle between the bottom wall and the guide chutes, and
defining a gap between the rear wall and the guide chutes, and
an elongate accumulating trough extending between the rear wall and the guide chutes extending coextensively along said rear wall between the side walls.

2. An apparatus as set forth in claim 1 wherein the accumulating trough includes an apertured trough bottom wall spaced above the bottom wall, and an apertured trough forward wall arranged forwardly of the rear wall in alignment with guide chute rear terminal ends, and an oil absorbent insert positioned within the accumulating trough to absorb hydrocarbons.

3. An apparatus as set forth in claim 2 wherein at least one of the guide chutes includes a forward anchor tab mounted thereto adjacent the bottom wall forward edge, wherein the anchor tab includes an opening therethrough receiving an anchor pin.

4. An apparatus as set forth in claim 3 wherein each of the guide chutes are removably mounted overlying the bottom wall, and each guide chute includes a central planar web, and the central planar web includes a "U" shaped first rib and a planar second rib, wherein each "U" shaped first rib is securable within an adjacent planar rib of an adjacent guide chute to permit securement and interlocking of the guide chutes together.

5. An apparatus as set forth in claim 4 wherein the bottom wall includes a plurality of water exit slots directed through the bottom wall and contiguous with the bottom wall forward edge and extending rearwardly of the bottom wall forward edge.

* * * * *